United States Patent [19]

Wahl

[11] 4,317,653
[45] Mar. 2, 1982

[54] EDUCATIONAL BLOCKS

[76] Inventor: Martha S. Wahl, 1 Huckleberry La., Ridgefield, Conn. 06877

[21] Appl. No.: 113,462

[22] Filed: Jan. 21, 1980

Related U.S. Application Data

[62] Division of Ser. No. 896,175, Apr. 14, 1978, abandoned.

[51] Int. Cl.³ ............................................ A63H 33/04
[52] U.S. Cl. ......................................... 434/211; 46/24
[58] Field of Search .................... 35/34, 69, 72; 46/24; 273/146, 156, 157 R, 293; 434/211

[56] References Cited

U.S. PATENT DOCUMENTS 2,843,971 7/1958 Gardellin .............................. 35/72 X
3,659,360 5/1972 Zeischegg ................................ 35/72

FOREIGN PATENT DOCUMENTS 1064191 12/1953 France .................................. 273/293
1316018 12/1962 France ..................................... 35/72
2338064 8/1977 France ................................. 273/146
429509 5/1935 United Kingdom .................... 46/24

OTHER PUBLICATIONS

Cundy and Rollett, "Mathematical Models", 1st Edition, pp. 94-99, 116, 117, Plate 2.
"Martin Gardners New Mathematical Diversion from Sci. Am.", p. 143 only, Sep. 1966.

Primary Examiner—Harland S. Skogquist
Attorney, Agent, or Firm—St. Onge, Steward, Johnston, Reens & Noe

[57] ABSTRACT

Sets of educational blocks are described wherein special volumetric relationships are combined with visually distinctive geometric shapes. In one set of blocks a common cube is cut into distinctive segments along a single slice to form particular polygons. In another set of blocks a common cube is cut in a manner to provide polyhedra of distinctive appearance with related outer segments used to fill out the common cube. Particular volumetric relationships between the polyhedra and their related segments are described.

2 Claims, 29 Drawing Figures

Fig. 9.
RECTANGULAR SLICE

Fig. 10.

Fig. 12.
TRISECTED CUBE

Fig. 13.

Fig. 23. OCTAHEDRON

Fig. 26.
ORTHOTETRAKAIDECAHEDRON

EDUCATIONAL BLOCKS

This is a division of application Ser. No. 896,175, filed Apr. 14, 1978, now abandoned.

FIELD OF THE INVENTION

This invention relates to educational blocks generally and to sets of educational blocks having particular shapes and volumetric relationships for the visualization and manipulation of interrelationships.

BACKGROUND OF THE INVENTION

Blocks having specific interrelationships are well known and have been described for educational uses. See, for example, the U.S. Pat. No. 3,208,162 to Wisdom wherein a square and cube root demonstrator is described. The U.S. Pat. No. 595,782 teaches a block model wherein a unit cube is divided into particular volumetric fractions such as a third, two thirds and the like. Several trigometric relations can be illustrated with the blocks. The block construction described by Randolph in U.S. Pat. No. 3,645,535 describes various relationships between a tetrahedron, cube, and an octahedron and adapting these in a block system. Various polyhedra are shown in a publication by Coxeter entitled "Introduction to Geometry", published by Wiley and Sons, and in a book entitled "Shapes, Space and Symmetry" by A. Holden, published by Columbia University Press in 1971.

SUMMARY OF THE INVENTION

With a set of educational blocks in accordance with the invention, the volumetric interrelationship of blocks formed from a common cube is provided with segments of particular volume. This technique enhances an understanding of the volumes involved in complex solids by assembling outer pieces to form a common cube. Visualization of a complex solid encased in a common cube reveals the kinds of symmetries which may be involved.

As described with reference to one embodiment for a set of blocks in accordance with the invention, a plurality of segments are cut from a common cube with a single slice. Various face shapes are obtained, depending upon the direction of the slice. Thus, a triangle, a rectangle, rhombus, pentagon, parallelogram and hexagon are illustrated with the sliced segments. A further interrelationship involves the selective sizing of the segments to provide a unique volumetric relationship which can be conveniently illustrated with a balance.

In another form of a set of educational blocks in accordance with the invention, well known polyhedra block forms are embedded in a common cube. These are special polyhedra or sections thereof of regular or semi-regular shapes such as the tetrahedron, octahedron, rhombic dodecahedron, pentahedron, and orthotetrakaidecahedron. These polyhedra are provided with complementary segments which respectively combine to form a common cube. Specific volumetric relations between the block segments illustrate the unique relationships of the blocks to each other.

These sets of educational blocks may be in solid form or in die cut form to be subsequently erected.

It is, therefore, an object of the invention to provide sets of educational blocks for illustrating geometric interrelationships. It is a further object of the invention to provide a set of educational blocks with volumetric correspondences which are selected to enhance an understanding of various geometric relationships.

These and other objects of the invention can be understood from the following description of sets of educational blocks in accordance with the invention and described with reference to the following drawings.

DESCRIPTION OF EMBODIMENTS

FIGS. 1 through 11 show a variety of common cube forming blocks which can be used to provide a set of educational blocks. The set of blocks is formed by selecting at least several common cube forming blocks from the group of blocks illustrated in FIGS. 1–11. Each set of blocks includes a plurality of block segments which selectively combine to form an identical common cube 50. The blocks in FIGS. 1–11 are each characterized in that the segments are made with a single planar slice of the common cube. The blocks can be made from a material such as wood, metal or plastic or from a self-erected cardboard sheet and the like. The slices are so selected that the resulting plane surface represents specific shapes and the individual block segments have a particular volumetric relationship to the common cube.

Figures 1, 2:
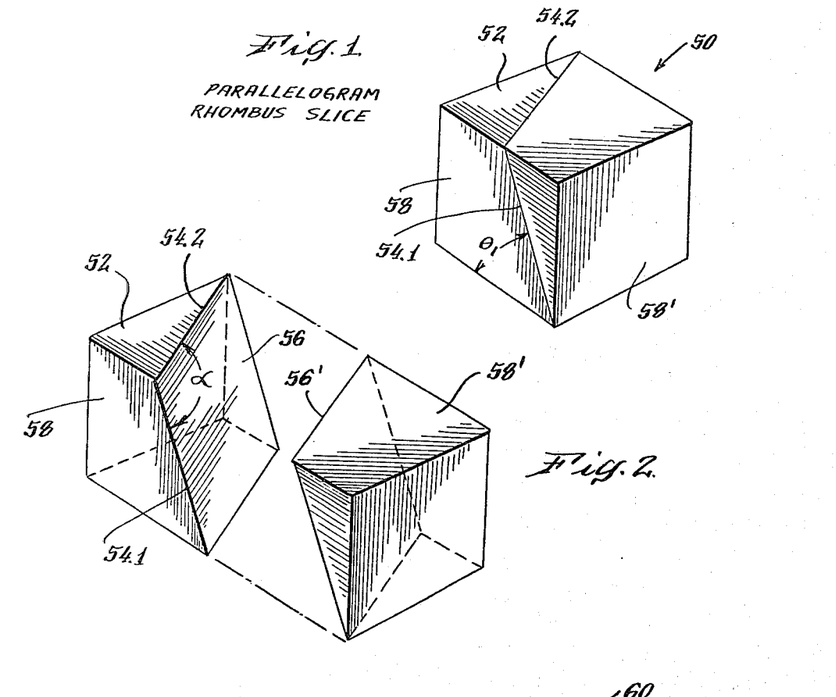
FIG. 1 is a perspective view of a common cube with a single slice at an angle selected to form an equilateral parallelogram or rhombus face.
FIG. 2 is a perspective exploded view of the sliced segments of FIG. 1.

Thus, with reference to FIGS. 1 and 2, a common cube 50 is cut along a plane at such an angle $\theta_1$ (about 63°26′) relative to face 52 that edges 54.1 and 54.2 are equal. The resulting faces 56, 56′ on segments 58, 58′ are each a rhombus or parallelogram having equilateral sides. The related segments 58, 58′ are of equal volume and corresponding equal weight. A parallelogram can also be made by adjusting angle $\theta_1$ accordingly.

Figures 3, 4:
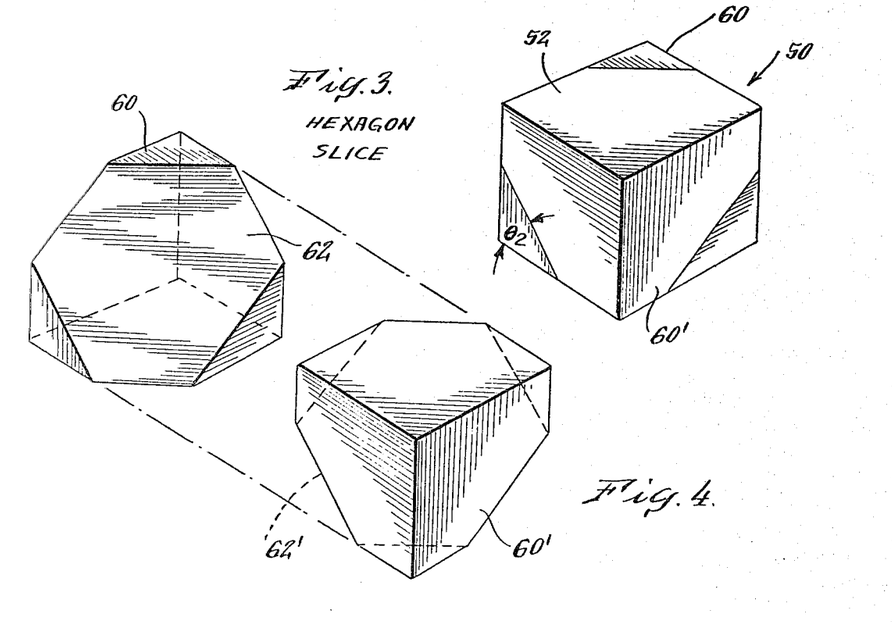
FIG. 3 is a perspective view of a common cube with a single slice at an angle selected to form a regular hexagon face.
FIG. 4 is a perspective exploded view of the sliced segments of FIG. 3.

In FIGS. 3 and 4 a common cube 50 is sliced along a plane so as to produce related segments 60—60′ of equal volume but with regular hexagon faces 62—62′. The angle $\theta_2$ of the plane hexagon faces 62 relative to face 52 is 45°.

Figures 5, 6, 7, 8:
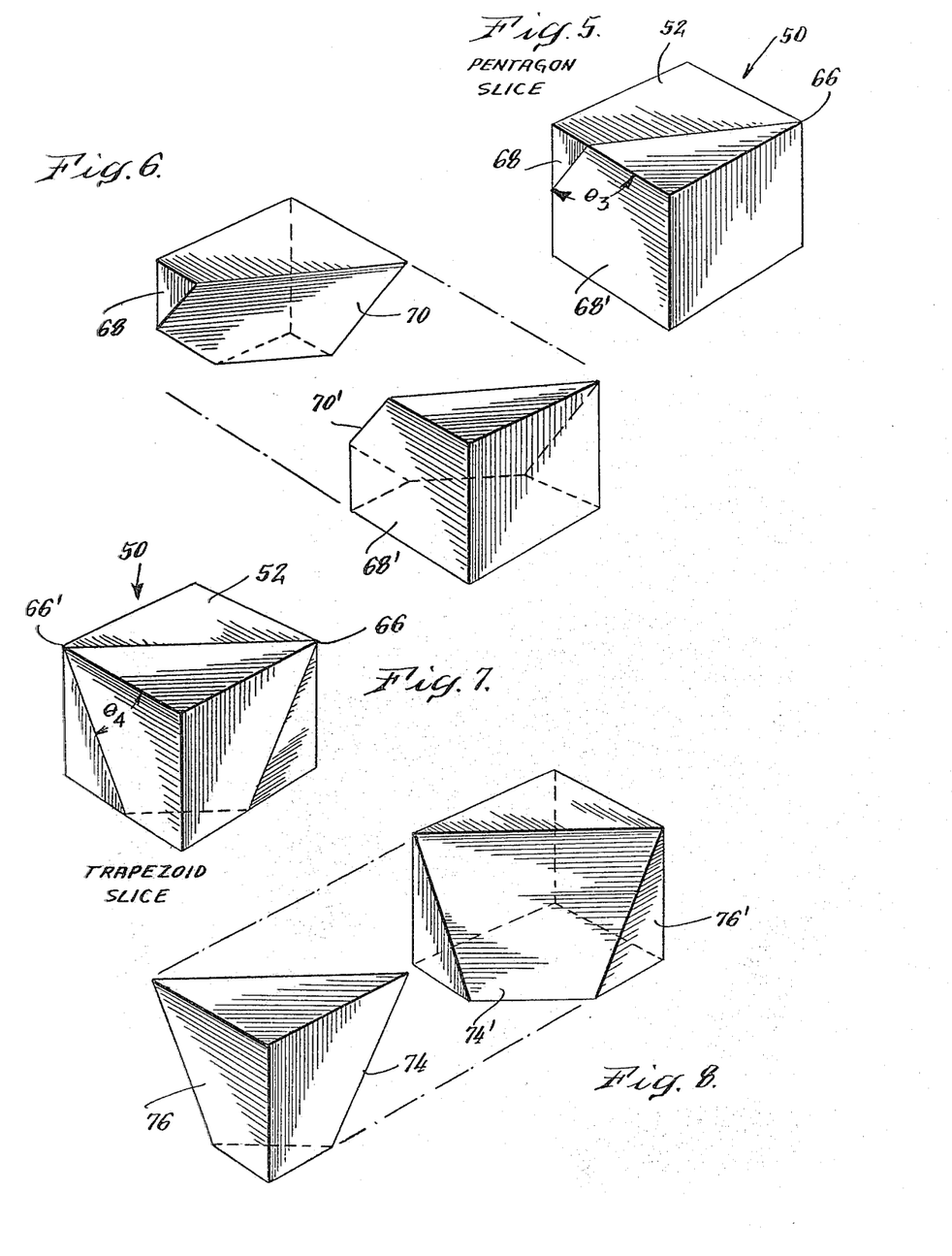
FIG. 5 is a perspective view of a common cube with a single slice at an angle selected to form a pentagon face.
FIG. 6 is a perspective exploded view of the sliced segments of FIG. 5.
FIG. 7 is a perspective view of a common cube with a single slice at an angle selected to form a trapezoidal face.
FIG. 8 is a perspective exploded view of the sliced segments of FIG. 7.

In FIGS. 5 and 6 the common cube 50 is sliced along a plane intersection corner 66 and forming an angle $\theta_3$ with face 52 so that related segments 68, 68′ have pentagon faces 70, 70′ and are respectively ⅓ and ⅔ of the volume of common cube 50.

In FIGS. 7 and 8, the common cube 50 is sliced along a plane intersecting opposite corners 66—66′ at such angle $\theta_4$ relative to face 52 to form trapezoidal faces 75, 75′ on segments 76, 76′ which are respectively ⅓ and ⅔ of the volume of common cube 50.

Figures 9, 10:
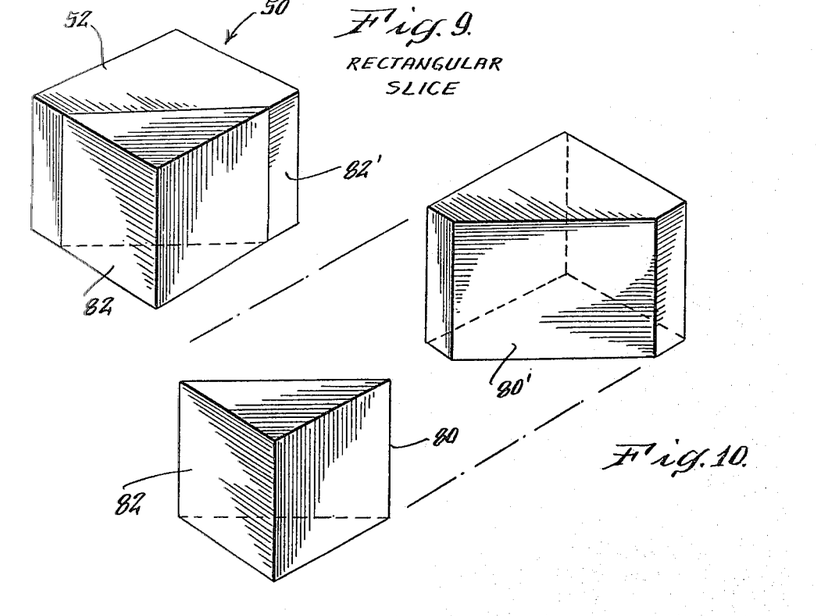
FIG. 9 is a perspective view of a common cube with a single slice at an angle selected to form a rectangular face.
FIG. 10 is a perspective exploded view of the sliced segments of FIG. 9.

FIGS. 9 and 10 illustrate a common cube 50 which is sliced along a plane which is transverse to face 52 to form a pair of rectangular faces 80—80′ on related segments 82—82′ which are respectively 1/6 and 5/6 of the volume of common cube 50.

Figures 11, 14, 15, 16, 17, 18, 19:
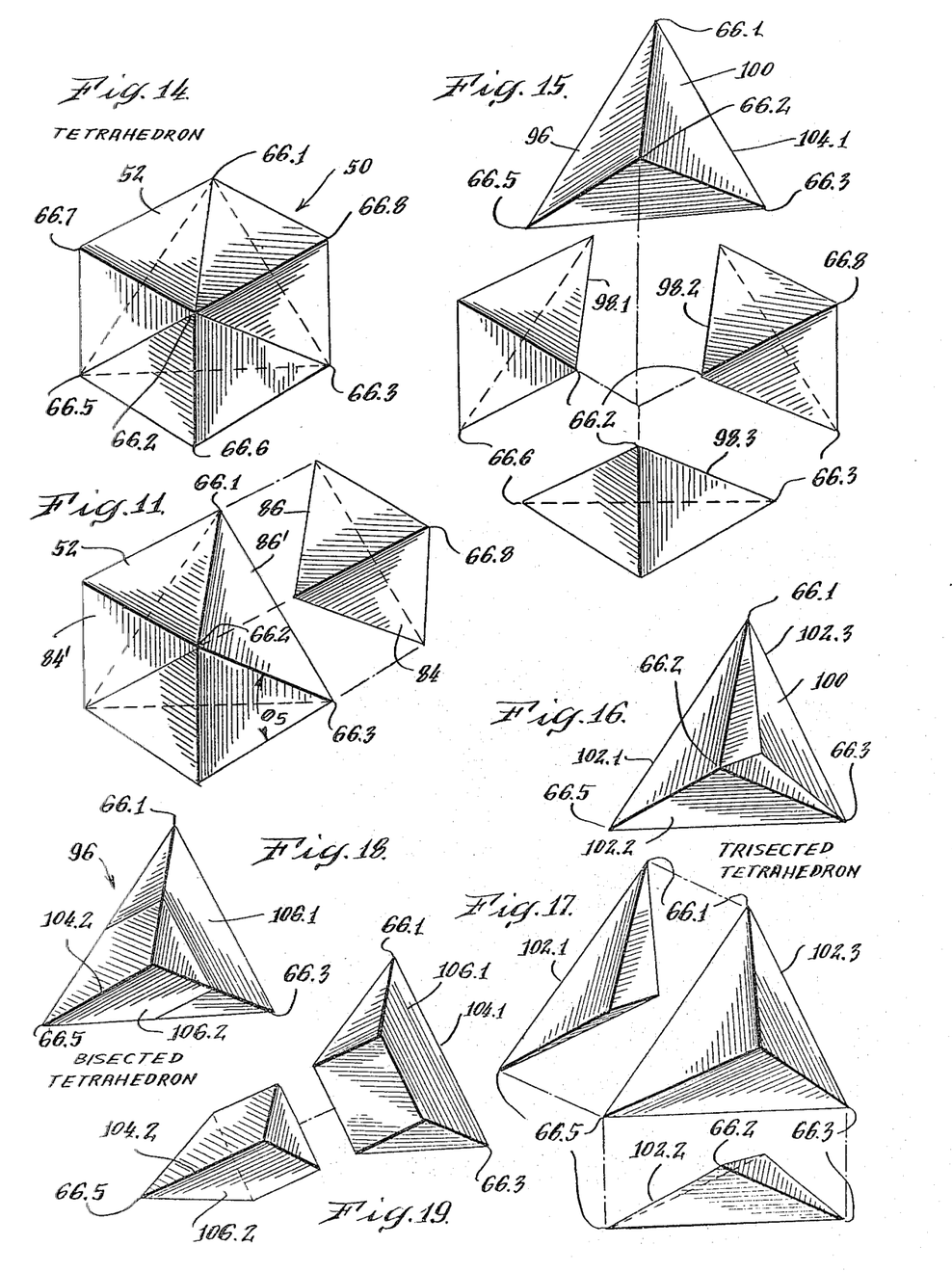
FIG. 11 is a perspective exploded view of segments of a common cube having a single slice at an angle selected to form a triangular face.
FIG. 14 is a perspective view of a common cube cut into four segments including a regular tetrahedron and three pyramidal outer tetrahedrons.
FIG. 15 is a perspective exploded view of the four segments shown in combined form in FIG. 14.
FIG. 16 is a perspective view of a trisected regular tetrahedron as shown in FIG. 15.
FIG. 17 is a perspective exploded view of the trisectional segments of the tetrahedron as shown in FIG. 16.
FIG. 18 is a perspective view of an assembled bisected regular tetrahedron as shown in FIG. 15.
FIG. 19 is a perspective exploded view of the bisected segments of the tetrahedron as shown in FIG. 18.

FIG. 11 illustrates a pair of related segments 84—84′ sliced from a common cube by a plane intersecting opposite corners 66—66′ of face 52. The slice is made at such an angle $\theta_5$ (of 45°) that it intersects a third corner 66″ to form triangle faces 86—86′ while segments 84—84′ are respectively 1/6 and 5/6 of the volume of a common cube 50.

With the set of block segments as described with reference to FIGS. 1–11, the various planar geometric faces can be explained and illustrated with the interrelated volumes. The transformation of a cube into these relatively simple planar figures advantageously enhances an understanding of the two dimensional and three dimensional relationships between planar figures and solids.

FIGS. 12–29 show a plurality of common cube forming blocks which can be used to provide a set of blocks of distinctive intricate polyhedra. The set of polyhedra blocks is so formed by selecting at least several common cube forming blocks from the group of blocks illustrated in FIGS. 12–29.

Figure 12:
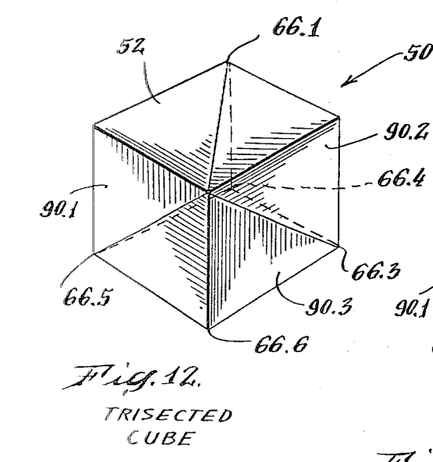
FIG. 12 is a perspective view of a common cube cut into three equal triad pentahedron segments along cubic diagonal lines.
Figure 13:
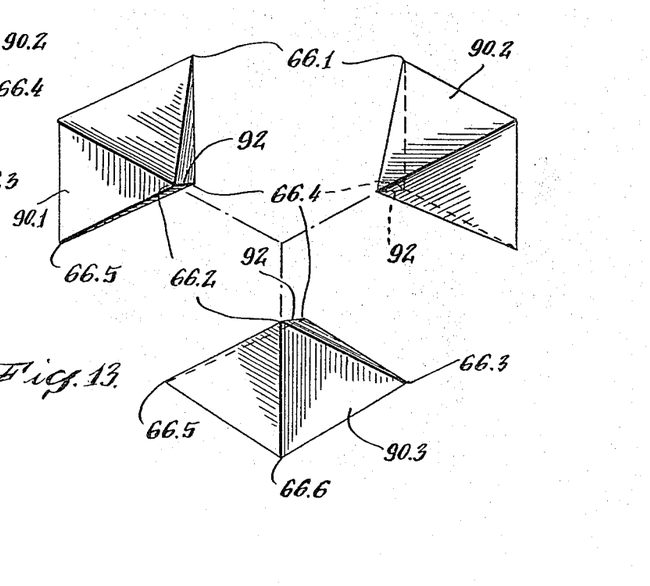
FIG. 13 is a perspective exploded view of the triad segments of FIG. 12.

In FIGS. 12 and 13 a common cube 50 is shown cut into a triad of equal sized diagonal pentahedrons 90, each of which has a common diagonal 92 formed between opposite corners 66′—66″ of the cube 50. Each diagonal pentahedron is one third of the volume of the common cube 50.

In FIGS. 14 and 15 a common cube 50 is cut into a regular tetrahedron 96 and three outer pyramidal tetrahedron segments 98. The tetrahedron 96 is formed with three planar cuts respectively along corners 66.2, 66.3, 66.5; and 66.1, 66.2, 66.3 and 66.1, 66.2 and 66.5. The regular tetrahedron 96 has one third of the volume of the common cube 50 while the outer pyramidal tetrahedrons 98 each include one sixth of the common cube volume. The outer pyramidal tetrahedrons 98 are congruent to slice 84 in FIG. 11.

Further division of regular tetrahedron 96 yields as shown in FIGS. 16 and 17 a trisected tetrahedron and in FIGS. 18 and 19 a bisected tetrahedron. The trisectional cuts are made in a particular manner as illustrated by intersecting a face, such as 100, with three planes which bisect the angles on face 100 at corners 66.1, 66.2 and 66.3 as well as intersect the corner 66.5 opposite face 100. The resulting trisected tetrahedron segments 102 are each one ninth of the volume of the common cube 50 and each have one equilateral triangular face and three isosceles transfer faces.

The bisection of regular tetrahedron 96 is carried out as shown in FIGS. 18 and 19 along a plane which is midway between and parallel to both oppositely located edges 104.1 and 104.2. Each bisected tetrahedron segment 106 is one sixth of the volume of the common cube 50.

Figures 20, 21, 22:
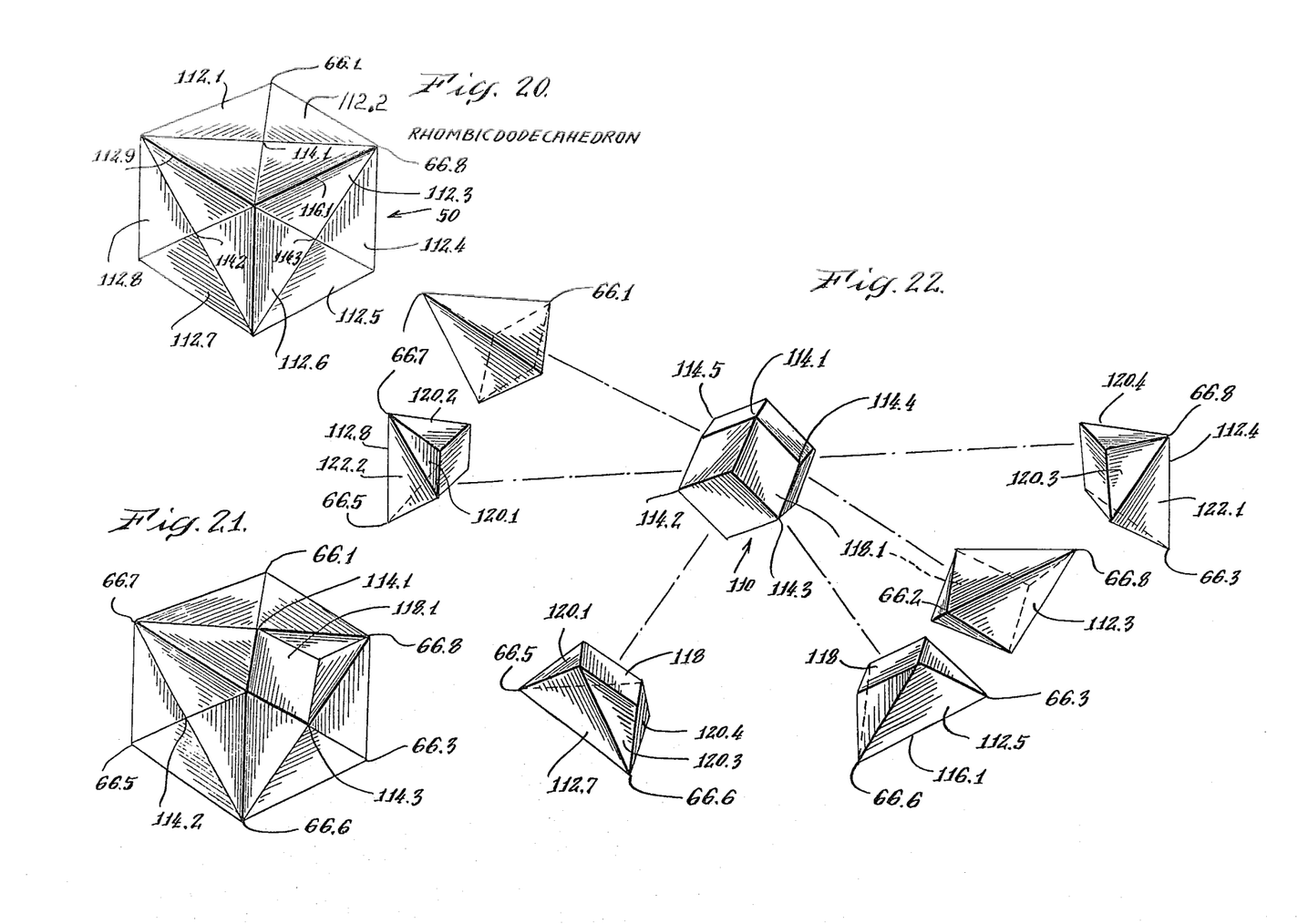
FIG. 20 is a perspective view of a common cube cut into a plurality of septahedrons which combine with a regular rhombic dodecahedron to form the common cube.
FIG. 21 is a perspective of the common cube as shown in FIG. 20 with one of the septahedron segments removed.
FIG. 22 is a perspective exploded view of the segments of the common cube shown in FIG. 20.

A particularly instructional part of the set of blocks includes as shown in FIGS. 20–22, the regular rhombic dodecahedron 110 and twelve congruent outer related septahedra 112. The rhombic dodecahedron 110 is one of the ideal cell shapes to a biologist reviewing nature's cell shapes and surface areas. The rhombic polyhedron 110 is the largest possible from a common cube 50 and has six corners such as 114.1, 114.2 and 114.3 each at the midpoint of the faces of the common cube 50. Each outer septahedron has an external edge 116 of the common cube 50 and an internal rhombus face 118 which is congruent with those on the rhombic polyhedron 110. The outer septahedra 112 each occupy one sixteenth and the rhombic polyhedron 110 one quarter of the volume of the common cube 50. Any four of the outer septahedra 112 may be combined to form another rhombic dodecahedron congruent to polyhedron 110.

Each outer edge defining septahedron 112 has faces formed of six isosceles triangles, four of which, 120, are smaller and congruent and two, 122, are larger and congruent. The smaller triangular faces 120 define the sides of the rhombus faces 118.

Figures 23, 24, 25:
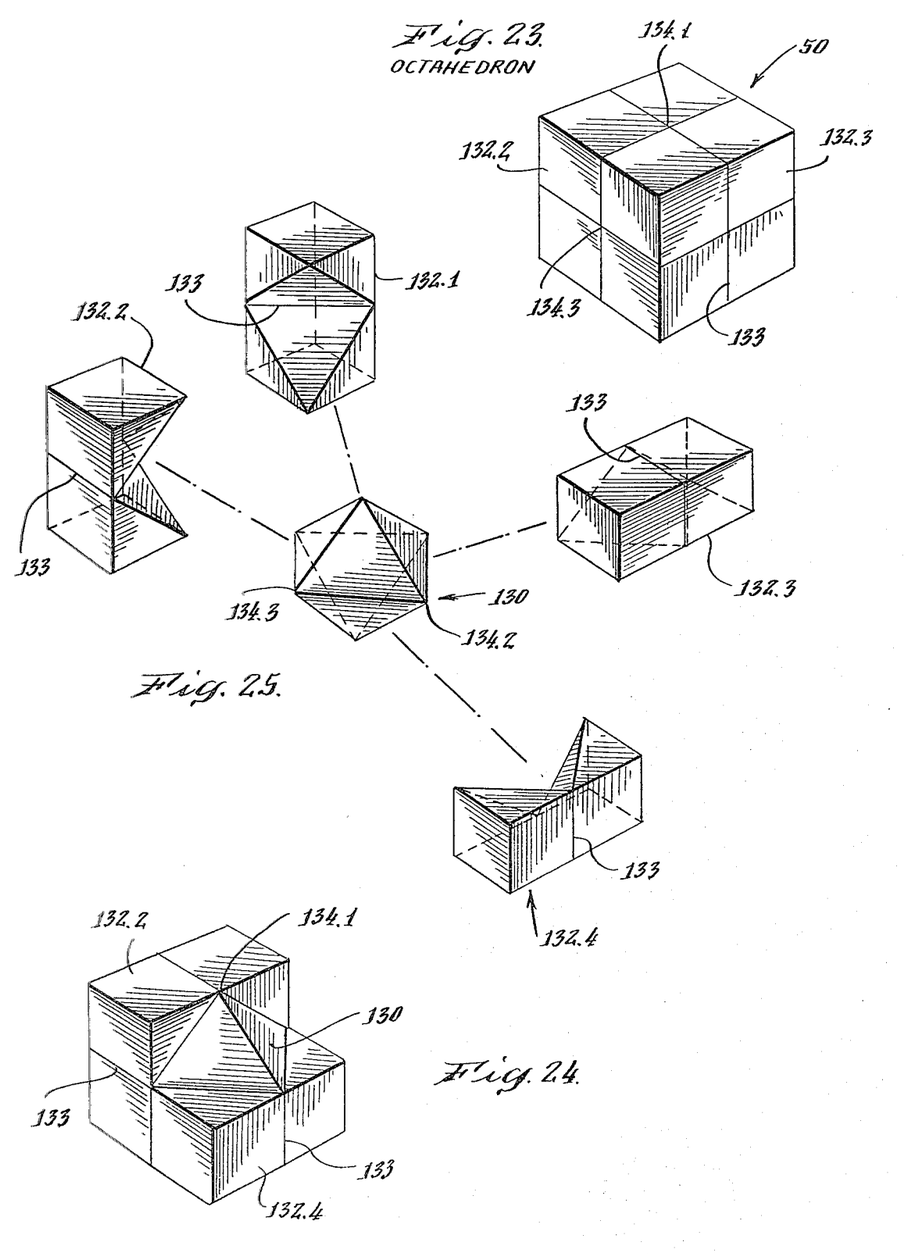
FIGS. 23 and 24 are perspective views of an assembled common cube cut into a regular octahedron and outer octahedron segments.
FIG. 25 is an exploded view of the segments of the common cube shown in FIG. 23.

The largest regular triangular faced octahedron 130 which can fit inside common cube 50 is shown in FIGS. 23–25 with outer segments 132. The octahedron 130 occupies one sixth of the volume of the common cube 50 while each outer segment 132 represents five-twelfth of the common cube volume in the form of a septahedron as shown in FIG. 25 or five twenty-fourth in the form of a hexahedron when the septahedra 132 are bisected along planes as shown by lines 133. The bisected septahedra 132 are proportional in size and shape to the truncated common cube 84' shown in FIG. 11 with a triangular face 86'. FIG. 24 illustrates where outer segment 132.1 is removed, that the corners 134 of the octahedron are at the midpoint of the faces of the common cube 50.

FIGS. 26–29 illustrate a common cube 50 formed with an orthotetrakaidecahedron 140 and eight regular hexagon faced corner forming septahedra 142. The orthotetrakaidecahedron is known as one of the ideal cell shapes to a biologist when he investigates nature's packaging of cells for maximum content with minimum surface area. The polyhedron 140 has eight congruent regular hexagon faces 144 and six congruent square faces 146 which form part of the faces of the common cube 50. Each corner forming septahedron 142 has a regular hexagon face 144' which is congruent with a face 144. The orthotetrakaidecahedron 140 occupies one half of the volume of the common cube 50 and each septahedron 142 forms one sixteenth of the volume of the common cube 50. The eight septahedra 142 can be assembled to form another congruent orthotetrakaidecahedron 140.

Having thus described sets of blocks in accordance with the invention, their educational advantages can be appreciated.

Figures 26, 27, 28, 29:
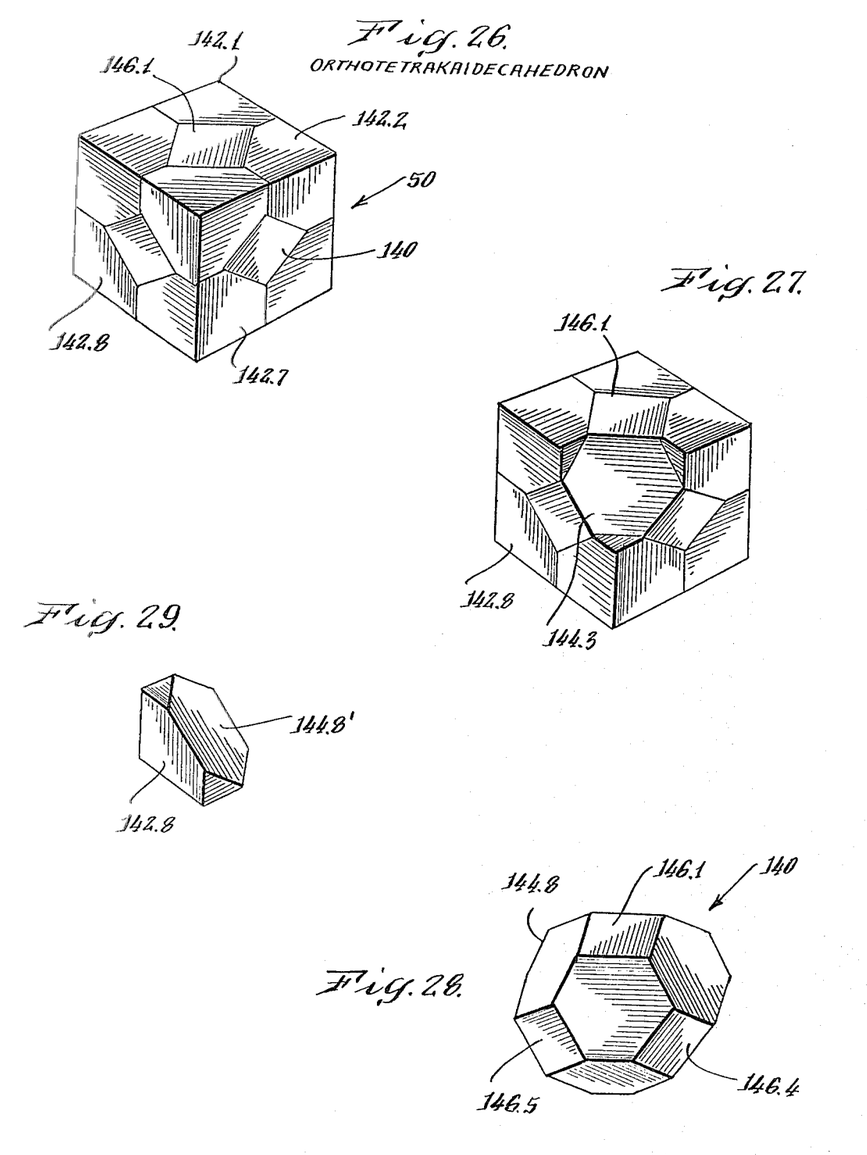
FIGS. 26 and 27 are perspective views of an assembled common cube cut into an orthotetrakaidecahedron and complementary hexagon faced corner forming septahedra.
FIG. 28 is a perspective view of the orthotetrakaidecahedron shown in FIG. 27.
FIG. 29 is a perspective view of the corner forming septahedron shown in FIGS. 26 and 27.

The rhombic dodecahedron and the orthotetrakaidecahedron with their respective related segments enable one to discover a volumetric relationship. For the rhombic dodecahedron 110 the outer edge forming segments 112 may be combined to form three other congruent rhombic dodecahedra 110, thus illustrating what appear as magic relationships. The combination of the corner forming related segments 142 of the orthotetrakaidecahedron 140 also establish an apparently magical volume relationship useful to illustrate how complex shapes can be analyzed with relatively simple techniques.

The volumetric relationship can be illustrated with a balance when the blocks are made from a same density material. Thus, for example, blocks which have a one half volumetric relationship with the common cube can be compared and employed to enhance an understanding of the interplay between the block shapes. Seeing many differently shaped blocks but of the same volume is a meaningful experience for young and old alike. The transformation of a common cube into distinctive geometric shapes can be conveniently taught.

What is claimed is:

1. A set of educational blocks formed from a common cube and comprising
   an orthotetrakaidecahedron being the largest which can fit inside said common cube and eight related outer segments which fit in complementary fashion with the orthotetrakaidecahedron to fill out a common cube, said related segments being combinable to form a congruent orthotetrakaidecahedron.

2. The set of educational blocks as claimed in claim 1 wherein said related outer segments are congruent and each defines a corner segment of the common cube with one-sixteenth of the volume of the common cube.

* * * * *